United States Patent [19]

Kamiyama et al.

[11] Patent Number: 5,252,407
[45] Date of Patent: Oct. 12, 1993

[54] RUBBER COMPOSITE

[75] Inventors: Kiyosuke Kamiyama; Shuzo Sawada, both of Tsuruga; Kazuyuki Yabuki, Ootsu; Yasuo Sano, Minoo, all of Japan

[73] Assignees: Takeda Chemical Industries, Ltd.; Toyo Boseki Kabushiki Kaisha, both of Osaka, Japan

[21] Appl. No.: 794,623

[22] PCT Filed: Sep. 28, 1988

[86] PCT No.: PCT/JP88/00983
  § 371 Date: May 25, 1989
  § 102(e) Date: May 25, 1989

[87] PCT Pub. No.: WO89/02908
  PCT Pub. Date: Apr. 6, 1989

Related U.S. Application Data

[62] Division of Ser. No. 362,419, May 25, 1989, abandoned.

[30] Foreign Application Priority Data
  Oct. 1, 1987 [JP] Japan .................. 62-248959

[51] Int. Cl.$^5$ .................. B32B 27/06; C08K 5/34

[52] U.S. Cl. .................. 428/480; 524/96; 524/104; 428/395; 428/327

[58] Field of Search .................. 428/327, 395, 480; 524/96.95, 99, 104; 525/326.8, 375, 256, 259

[56] References Cited

U.S. PATENT DOCUMENTS

| | | | |
|---|---|---|---|
| 3,900,532 | 8/1975 | Dietrich et al. | 525/112 |
| 3,959,215 | 5/1976 | Schneider | 524/95 |
| 4,164,114 | 8/1979 | Yabuki et al. | 528/308 |
| 4,288,361 | 9/1881 | Zestermann et al. | 524/95 |
| 4,409,055 | 10/1983 | Elmer | 428/395 |
| 4,460,029 | 7/1984 | Schuetz et al. | 428/395 |
| 4,880,857 | 11/1989 | Mori et al. | 523/205 |

FOREIGN PATENT DOCUMENTS

| | | | |
|---|---|---|---|
| 703198 | 2/1965 | Canada | 524/95 |
| 1-158057 | 6/1989 | Japan | 524/95 |

Primary Examiner—Kriellion S. Morgan
Attorney, Agent, or Firm—Wenderoth, Lind & Ponack

[57] ABSTRACT

A rubber composite comprising polyester fibers as the reinforcing material, wherein a compound having at least one cyclic imino ether group of a specific structure in its molecule is incorporated in a rubber composite except for adhesive-treated polyester cords.

1 Claim, 2 Drawing Sheets

RUBBER COMPOSITE

This application is a division of now abandoned U.S. application Ser. No. 07/362,419 filed May 25, 1989.

DESCRIPTION

1. Technical Field

The present invention relates mainly to a rubber composite such as tires, belts, hoses, etc. in which polyester high-tenacity fibers for industrial materials are used, and more particularly to a rubber composite to which special additives are added and which is suitable for uses in which said polyester high-tenacity fibers, a reinforcing material for the rubber composite, suffer degradation during use and processing, said degradation being caused by the participation of amines derived from the additives in the rubber.

2. Background Art

Presently used rubber composites with polyester high-tenacity fibers as a reinforcing material, for example tires, have a problem that, when used at high temperatures resulting from their own heat build-up or the temperature of the environment, the polyester high-tenacity fibers, a reinforcing material, have a lower tensile strength and adhesion strength. It has long been recognized that this thermochemical stability in rubber is a serious problem for the polyester fibers, and W. W. Daniels, et al. proposed, as early as 1959, to improve the chemical stability by reducing the content of terminal carboxyl groups to 15 equivalents/$10^6$ g or less (Japanese Patent Publication No. 5821/1962). After that, a large number of concrete methods for reducing the content of terminal carboxyl groups in the polyester fibers have also been proposed, as shown for example in U.S. Pat. No. 3975329 and Japanese Patent Kokai No. 116816/1980. Further, there have been disclosed techniques of improving the thermochemical stability of the polyester in rubber by removing moisture from rubber composites by incorporating calcium oxide (Japanese Patent Kokai No. 29471/1972) or isatonic anhydride (Japanese Patent Publication No. 36276/1975) in the rubber, or removing amides from rubber composites by incorporating 2-chloro-4,6-diamino-S-triazine (Negodeg PE TM) in the rubber (French Patent No. 2066198). In recent years, quite a novel method was disclosed by the present inventors in which the mobility of amorphous chains of the polyester is reduced in order to reduce the permeability of amines in the rubber composite to the polyester (Japanese Patent Kokai No. 224879/1985, 12952/1986 and 146876/1986).

DISCLOSURE OF THE INVENTION

However, according to the inventors' study on the degradation of the polyester in rubber {Yabuki and Sawada, Sen'i Gakkai-shi, Vol. 41, No. 11, T-467 (1985)}, the degradation of the polyester is hydrolysis catalyzed mainly by amines, and the terminal carboxyl groups hardly act as an acid catalyst for the hydrolysis.

(1) Consequently, the techniques to decrease the content of carboxyl groups disclosed in the literature, including Japanese Patent Publication No. 5821/1962, are not so effective to prevent the polyester from degradation.

(2) The techniques to remove moisture from rubber, which are disclosed in Japanese Patent Kokai No. 29471/1972 and Japanese Patent Publication No. 36276/1975, cannot maintain the effect because the moisture of rubber composites is supplied from the outside.

(3) The technique to remove amines disclosed in French Patent No. 2066198 has this effect, although it is a technique which was developed with such mechanism as described in detail in the present invention remaining unknown. It is a matter of regret, however, that when said compound is incorporated in rubber, scorch breaks out to make it difficult to put the rubber to practical use.

(4) The present inventors' prior application (Japanese Patent Kokai No. 224879/1985) is a technique based on a unique idea, but in principle, it has no effect to prevent the thermochemical degradation at the adhesion interface between the polyester surface and rubber, and therefore there is a limitation to the use of this technique.

An object of the present invention is to eliminate the above conventional drawback of rubber composites with polyester high-tenacity fibers as a reinforcing material, i.e. a drawback that the chemical stability of the reinforcing material is poor when the composites are used at high temperatures, by a technique which can be applied to industry.

A means for solving the above problem, i.e. the constitution of the present invention, is a rubber composite with polyester fibers as a reinforcing material containing a compound having at least one cyclic iminoether group represented by the formula (I) in the molecule,

wherein X represents an ethylene group, substituted ethylene group, trimethylene group or substituted trimethylene group which makes the cyclic structure of the formula (I) a five-membered or six-membered ring, in the rubber matrix excluding the portion of the adhesive-treated polyester fibers.

As the rubber constituting the rubber composite of the present invention, there are mentioned natural rubbers, synthetic rubbers such as styrene/butadiene rubbers, acrylonitrile/butadiene rubbers, butyl rubbers, chloroprene rubbers, ethylene/propylene rubbers, etc. and mixtures thereof.

As the polyester fibers constituting the rubber composite of the present invention, there are mentioned copolyesters or homopolyesters containing an ethylene terephthalate unit, a polybutylene terephthalate unit or a polyethylene naphthalate unit; polyarylates (wholly aromatic polyesters) whose material is terephthalic acid, isophthalic acid, 2,6-naphthalenedicarboxylic acid, 2,6-acetoxynaphthoic acid, 4,4'-acetoxybiphenyl, diacetoxyhydroquinone, cyclohexane dimethanol, p-oxybenzoic acid or their derivatives; etc. However, the polyester fibers of the present invention are not limited to these, specific examples, and the present invention is effective for fibers composed of linear-chain high molecular compounds connected mainly through ester linkages. The foregoing polyester fibers need to be adhesive-treated in advance in order to obtain solid adhesion between the fibers and rubber. As the adhesive, a mixture of a resorcinol/formalin initial condensate, generally called RFL, and a latex, and an adhesion promotor such as epoxy resins, Vulcabond E (produced by Vulnax Co.), etc. are used. In the present invention, however, any adhesive which can give solid adhesion between the polyester fibers and rubber may be used.

As the additives for the rubber composite of the present invention, a compound is used which contains at least one cyclic iminoether group represented by the formula (I),

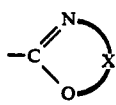

(I)

wherein X represents an ethylene group, substituted ethylene group, trimethylene group or substituted trimethylene group which makes the cyclic structure of the formula (I) a five-membered or six-membered ring, in the molecule.

The cyclic iminoether structure represented by the formula (I) is an oxazoline ring when it has a five-membered structure, and an oxazine ring when it has a six-membered structure. X represents an ethylene group, substituted ethylene group, trimethylene group or substituted trimethylene group, and among these, those having no substituent are preferred. As the substituent, there are mentioned $C_1$-$C_{10}$ alkyl groups such as methyl, ethyl, propyl, butyl, pentyl, hexamethyl, octamethyl, nonamethyl, decamethyl, dimethylmethyl, etc.; $C_6$-$C_{12}$ aryl groups such as phenylene, naphthyl, diphenyl, etc.; $C_5$-$C_{12}$ cycloalkyl groups such as cyclohexyl; other $C_8$-$C_{20}$ aralkyl groups, etc.

Specific examples of the compound containing at least one of the above ring structures in the molecule include the following : Monooxazoline compounds such as 2-oxazoline, 2-methyl-2-oxazoline, 2-ethyl-2-oxazoline, 2-propyl-2-oxazoline, 2-butyl-2-oxazoline, 2-pentyl-2-oxazoline, 2-hexyl-2-oxazoline, 2-heptyl-2-oxazoline, 2-undecyl-2-oxazoline, 2-heptadecyl-2-oxazoline, 2-phenyl-2-oxazoline, 2-cyclohexyl-2-oxazoline, 2-benzyl-2-oxazoline, 2-naphthyl-2-oxazoline, 2-dichloromethyl-2-oxazoline, 2-trichloromethyl-2-oxazoline, 2-chlorophenyl-2-oxazoline, 2-phenyl-4-methyl-2-oxazoline, 2-phenyl-4-ethyl-2-oxazoline, 2-phenyl-4,4-dimethyl-2-oxazoline, 2-phenyl-5-methyl-2-oxazoline, etc.; bisoxazoline compounds such as 2,2'-bis(2-oxazoline), 2,2'-bis(4-methyl-2-oxazoline), 2,2'-bis(4,4-dimethyl-2-oxazoline), 2,2'-bis(4-ethyl-2-oxazoline), 2,2'-bis(4,4-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4-dimethyl-2-oxazoline), 2,2'-(1,3-phenylene)bis(2-oxazoline), 2,2'-(1,4-phenylene)bis(2-oxazoline), 2,2'-(1,2-phenylene)bis(2-oxazoline), etc.; monooxazine compounds such as 5,6-dihydro-4H-1,3-oxazine, 2-methyl-5,6-dihydro-4H-1,3-oxazine, 2-ethyl-5,6-dihydro-4H-1,3-oxazine, 2-propyl-5,6-dihydro-4H-1,3-oxazine, 2-butyl-5,6-dihydro-H-1,3-oxazine, 2-pentyl-5,6-dihydro-4H-1,3-oxazine, 2-phenyl-5,6-dihydro-4H-1,3-oxazine, 2-perfluoroheptyl-5,6-dihydro-4H-1,3-dihydro-4H-1,3-oxazine), etc.; and bisoxazine compounds such as 2,2'-bis(5,6-dihydro-4H-1,3-oxazine), 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-(1,3-phenylene)bis(5,6-dihydro-4H-1,3-oxazine), 2,2'-(1,4-phenylene)bis(5,6-dihydro-4H-1,3-oxazine), etc. More preferred compounds include monooxazoline compounds such as 2-oxazoline, 2-methyl-2-oxazoline, 2-ethyl-2-oxazoline, 2-propyl-2-oxazoline, 2-butyl-2-oxazoline, 2-pentyl-2-oxazoline, 2-hexyl-2-oxazoline, 2-heptyl-2-oxazoline, 2-undecyl-2-oxazoline, 2-heptadecyl-2-oxazoline, 2-phenyl-2-oxazoline, 2-cyclohexyl-2-oxazoline, 2-benzyl-2-oxazoline, 2-naphthyl-2-oxazoline, 2-dichloromethyl-2-oxazoline, 2-trichloromethyl-2-oxazoline, 2-chlorophenyl-2-oxazoline, etc.; bisoxazoline compounds such as 2,2'-bis(2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'(1,3-phenylene)bis(2-oxazoline), 2,2'-(1,4-phenylene)bis(2-oxazoline), etc.; monooxazine compounds such as 5,6-dihydro-4H-1,3-oxazine, 2-methyl-5,6-dihydro-4H-1,3-oxazine, 2-ethyl-5,6-dihydro-4H-1,3-oxazine, 2-propyl-5,6-dihydro-4H-1,3-oxazine, 2-butyl-5,6-dihydro-4H-1,3-oxazine, 2-pentyl-5,6-dihydro-4H-1,3-oxazine, 2-phenyl-5,6-dihydro-4H-1,3-oxazine, etc.; and bisoxazine compounds such as 2,2'-bis(5,6-dihydro-4H-1,3-oxazine), 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-(1,4-phenylene)bis(5,6-dihydro-4H-1,3-oxazine), etc.

These compounds are added to the rubber composite excluding the adhesive-treated polyester cords in order to prevent amines in the rubber from permeating the polyester, a reinforcing material, of the rubber composite. The expression "to the rubber composite excluding the adhesive-treated polyester cords" referred to herein means "between the adhesive and rubber" and/or "in the rubber". This limitation is so important that the reason for it will be explained below. The reinforcing cord for the rubber composite is adhesive-treated in order to obtain a sufficient adhesion strength, and the temperature of this adhesive-treating step needs to be 200° C. or higher. Consequently, when the foregoing compounds used in the present invention are added to this step or the preceding steps, the compounds are inactivated by this heat-treatment to fail to obtain the effect of the present invention. The compounds, therefore, need to be added after this heat-treating step.

There is no particularly severe limitation to the amount of the compound having a cyclic iminoether group. The effect can be noticed even with a trace amount, but generally, the compound is used in an amount of from 0.01 to 20 wt.% based on the rubber composition.

The compound having a cyclic iminoether group of the present invention reacts with the amine, and in carrying out this reaction, there may be used a catalyst for the ring-opening polymerization of a cyclic iminoether compound as described, for example, in Polymer J., Vol. 3, No. 1, pp. 35–39 (1972) and "Polymerization Kinetics 7th series, Ring-opening Polymerization II", pp. 159–164, published by Kagaku-Dojin-Sha Co. in 1973. Specific examples of such catalyst include for example strong acids, sulfonic acid esters, sulfuric acid esters, organo-halogen compounds containing at least one halogen atom bonded to the alkyl carbon in the molecule, Lewis acids, etc.

The strong acids include for example organic acids such as phenylphosphoric acid, methanesulfonic acid, benzenesulfonic acid, p-toluenesulfonic acid, dodecylbenzenesulfonic acid, naphthalene-α-sulfonic acid, naphthalene-β-sulfonic acid, sulfanilic acid, phenylsulfonic acid, etc., and mineral acids such as oxoacids (e.g. phosphoric acid, sulfuric acid, nitric acid) and hydroacids (e.g. hydrochloric acid, hydrobromic acid, hydroiodic acid, hydrogen sulfide).

The ulfonic acid esters include for example methyl p-toluenesulfonate, ethyl p-toluenesulfonate, n-butyl p-toluene-sulfonate, etc.

The sulfuric acid esters include for example dimethyl sulfate, diethyl sulfate, etc.

Preferred examples of the organo-halogen compound are monohaloalkanes and polyhaloalkanes, and specifically, there are mentioned methyl iodide, butyl chloride, butyl bromide, n-hexyl bromide, butyl iodide, lauryl bromide, n-octyl bromide, stearyl bromide, allyl bromide, ethane tetrabromide, etc.

Other preferred specific examples of the organo-halogen compound include for example monohalomethylbenzenes (e.g. benzyl bromide, p,p′-dichloromethylbenzene), polyhalomethylbenzenes, α-bromo-n-propionic acid esters and α-bromoisobutyric acid esters.

Lewis acids include for example aluminum chloride, stannic chloride, vanadium chloride, vanadyl chloride, boron trifluoride etherate, etc.

The above catalysts may also be used in the rubber composite of the present invention, but the catalyst is not always limited to the foregoing specific examples, if it has the desired effect. It is a matter of course that the catalyst must properly be selected according to the composition of the rubber composite of the present invention. These catalysts may be used alone or in combination of two or more of them. The catalysts are used in an amount of from about 0 to about 5 wt.%, preferably from 0 to 1 wt.% based on the weight of the oxazoline compound.

Next, explanation will be given on why trapping the amine present in the rubber composite of the present invention is effective to achieve thermochemical stability of the rubber composite.

For example, the hydrolysis of polyethylene terephthalate (PET), a representative example of polyester fibers, is expressed by the following equation:

$$\text{Broken bonds (equivalent/10}^6 \text{ g)} = \frac{10380 \times Ci \times (E-1)}{10380 + E \times Ci} \quad (1)$$

$$E = e \times p[kt(10380 + Ci)] \quad (2)$$

$$k = e \times p\left(\frac{-11880}{T} + 16.48\right) \quad (3)$$

wherein Ci represents an initial amount of carboxyl groups of the PET fibers (equivalent/$10^6$ g), T represents a hydrolysis temperature (° K.) and t represents a hydrolysis time (hour).

Ammonolysis, which is a model reaction of the hydrolysis of PET catalyzed by amines, is expressed by the following equation:

$$\text{Broken bonds (equivalent/10}^6 \text{ g)} = \quad (4)$$

-continued
$$19.9 \times 10^6 \, e \times p(-6308/T) \cdot Ci \cdot t$$

wherein Ci represents an initial amount of carboxyl groups of the PET fibers (equivalent/$10^6$ g), T represents an ammonolysis temperature (° K.) and t represents an ammonolysis time (hour).

The comparison of the reaction rate constants of both reactions is shown in FIG. 1. The activation energy of the hydrolysis is 23.6 kcal/mole and that of the ammonolysis is 12.5 kcal/mole. The practical temperature at which the rubber composite is used is 150° C. or less, so that it is obvious that the ammonlysis occurs markedly easier than the hydrolysis in this temperature region. Hereupon, the comparison of both reaction rates is shown in FIG. 2 with regard to a case where an initial amount of carboxyl groups at 100° C. is 10 equivalents/$10^6$ g. Ammonolysis is a reaction wherein ammonia neutralizes the terminal carboxyl group to produce 1 molecule of water, and the water causes hydrolysis in the presence of ammonia (base catalyst). From FIG. 2, it is easily understandable that the rate of hydrolysis caused by the base catalyst is incomparably faster than that of hydrolysis wherein the terminal carboxyl groups act as an acid catalyst.

Consequently, it may be said that, in the region of practical use, the effect of the terminal carboxyl group on the hydrolysis of the polyester fibers is extremely little. On the other hand, when the amine permeates the polyester fibers, remarkable degradation of the fibers is caused.

The is the point of the present invention. That is, by reaction of the amine with the compound having a cyclic iminoether group added to the rubber matrix, the bulkiness of the amine increases to make it difficult for the amine to move within the rubber, and therefore permeation of the bulky amine into the polyester fibers naturally becomes extremely difficult. As a result, it becomes possible to prevent the decomposition of both the polyester itself and polyester layer which participates in adhesion strength at the interface between the polyester surface and rubber layer, and thus, the retention of the tenacity and adhesion strength of the polyester fibers markedly improves.

BEST MODE FOR CARRYING OUT THE INVENTION

Figure 1:
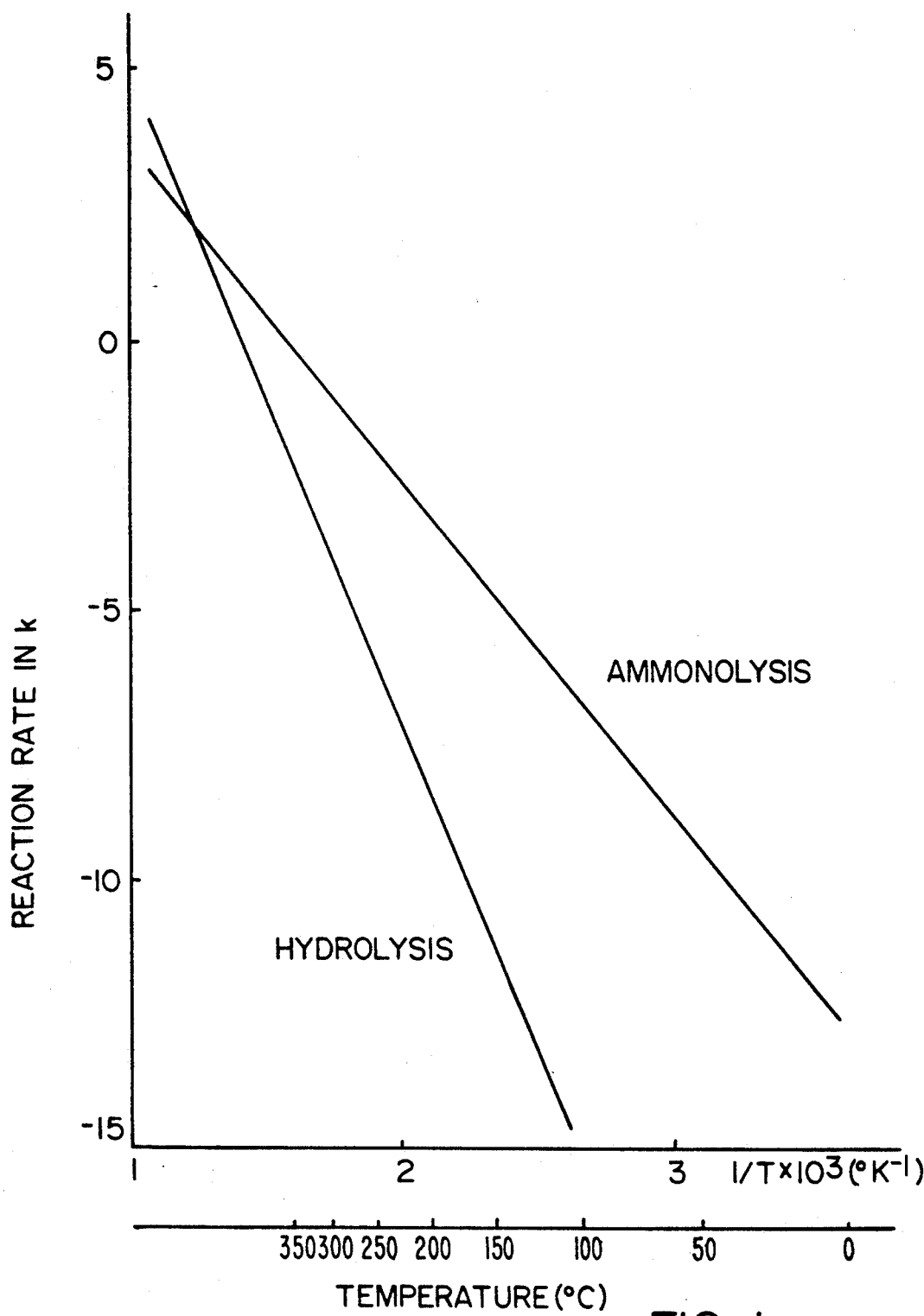
FIG. 1 shows diagrams illustrating the relationships between, on one hand, the rates of ammonolysis of PET fibers and hydrolysis of the same fibers in saturated steam, and on the other hand, the reciprocal of the absolute temperature. It can be seen that the rate of hydrolysis is extremely slow as compared with that of ammonolysis at the low-temperature side.
Figure 2:
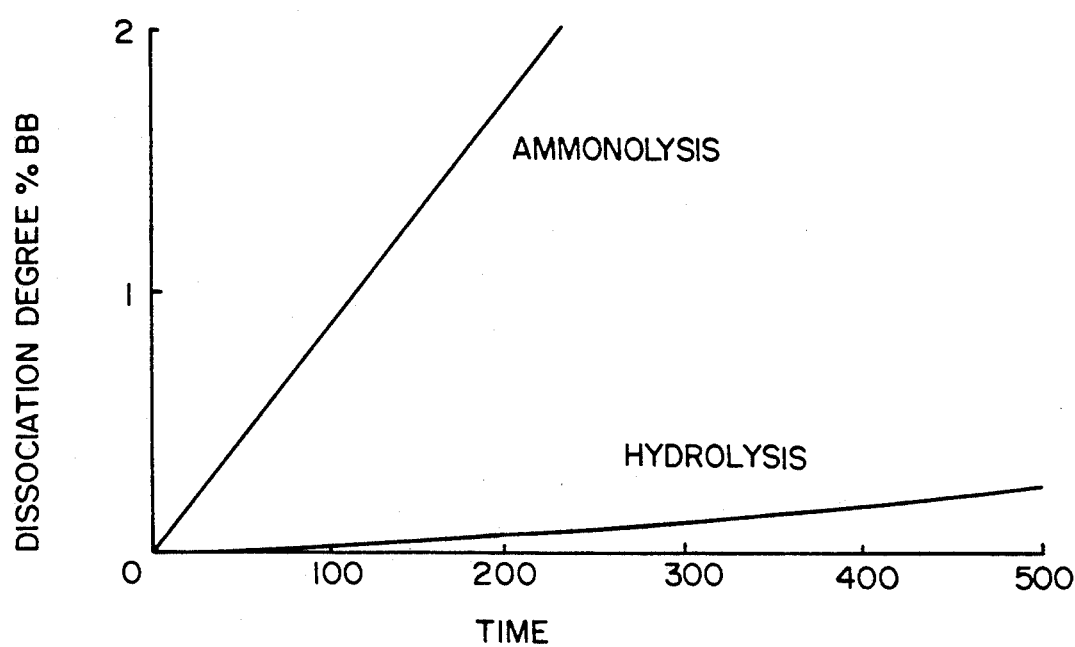
FIG. 2 shows a comparison of the dissociation degrees at 100° C. of ammonolysis of PET fibers and hydrolysis of the same fibers in saturated steam.

The present invention will be illustrated with reference to the following examples, but it is not limited to these examples.

EXAMPLE 1

Polyethylene terephthalate, its intrinsic viscosity being 1.0 as measured at 25° C. in a phenol/tetrachloroethane (6:4) mixed solvent, diethylene glycol content being 1.0 mole% and carboxyl group content being 10 equivalents/10⁶ g, was melt-spun and stretched by the usual method to obtain polyethylene terephthalate yarns of 1500D (190 filaments). The yarns obtained had a tensile strength of 13.5 kg and an elongation of 12.5%. Using the yarns, a two-ply cord of 38 t/10 cm in twist number for each of cable twist and ply twist was prepared and treated with an RFL solution containing Vulcabond E [produced by Vulnax Co.; old name, Pexul (a trade name of ICI Co.)] which is a reaction product of resorcinol, p-chlorophenol and formaldehyde. The composition of the treating solution was as follows.

|  | Part by weight |
| --- | --- |
| RF resin solution | |
| Water | 332.4 |
| Caustic soda | 1.3 |
| Resorcinol | 16.6 |
| Formaldehyde (37%) | 14.7 |
| subtotal | 365.0 |
| Pre-ageing: 25° C. × 6 hours | |
| RFL | |
| RF resin solution | 365.0 |
| VP latex | 195.0 |
| SBR latex | 50.0 |
| subtotal | 610.0 |
| Vulcabond E + RFL | |
| RFL | 610.0 |
| Vulcabond E | 183.0 |
| total | 793.0 |
| Ageing: 24 hours | |

The foregoing two-ply cords were dipped in this treating solution and treated at a temperature of 240° C. for 2 minutes at a stretch ratio of 3.0% to prepare adhesive-treated cords.

The blended rubber used for the test had the following composition:

| | |
| --- | --- |
| Natural rubber (RSS #1) | 100 parts by weight |
| Stearic acid | 2 |
| Zinc white | 4 |
| Sulfur | 2.5 |
| SRF-carbon black | 40 |
| Pine-tar | 3 |
| N-phenyl-N-isopropyl-p-phenylenediamine | 0.75 |
| 2,2,4-Trimethyl-1,2-dihydroquinone polymer | 0.75 |
| Vulcanization accelerator MBT | 0.8 |

2,2'-(1,3-Phenylene)bis(2-oxazoline) (hereinafter referred to as 1,3-PBO), a compound of the present invention, was added to the above rubber in an amount of from 0 to 20 wt.%.

The foregoing adhesive-treated cords were completely embedded in this rubber mixture and vulcanized in a mold at a temperature of 170° C. for 3 hours under a pressure of 30 kg/cm² for the purposes of vulcanization of the rubber and degradation of the composition at a high temperature. Thereafter, the treated cords were taken out of the vulcanized rubber composite and measured the for the residual strength and H adhesion strength.

The thermochemical stability was expressed by strength retention and adhesion strength retention, the former being the ratio in percentage of the strength of the treated cords after vulcanization to that of the treated cords before vulcanization, and the latter being the ratio in percentage to H adhesion strength obtained by vulcanization at 170° C. for 30 minutes. The results are shown in Table 1.

TABLE 1

| | | Amount of 1,3-PBO added (wt. %) | Strength retention (%) | Adhesion strength retention (%) |
| --- | --- | --- | --- | --- |
| A | (comparative example) | 0 | 31.6 | 38.0 |
| B | (present invention) | 0.5 | 57.7 | 39.0 |
| C | (present invention) | 1.0 | 72.4 | 41.9 |
| D | (present invention) | 2.0 | 94.0 | 47.5 |
| E | (present invention) | 3.0 | 95.3 | 65.0 |
| F | (present invention) | 5.0 | 99.1 | 83.1 |
| G | (present invention) | 10.0 | 100.5 | 103.4 |
| H | (present invention) | 15.0 | 99.5 | — |
| I | (present invention) | 20.0 | 98.3 | — |

Any of the rubber composites B to I of the present invention exhibits a remarkable thermochemical stability as compared with the rubber composite A used as a control. It is noticed that an improvement in the thermochemical stability by the addition of 2 wt.% or more of 1,3-PBO is so great that a reduction in the strength cannot be seen.

EXAMPLE 2

The effect of the various additives of the present invention was examined using the same adhesive-treated cords (dip cords) and rubber composition as used in Example 1. The action of methyl p-toluenesulfonate as a catalyst was also examined. The catalyst was added at the time of milling of the rubber. The strength retention and H adhesion strength retention of the cords after 3 hours' vulcanization at 170° C. are shown in Table 2. This table shows that the effect of the additives of the present invention is remarkable.

TABLE 2

| | | Cyclic iminoether | Amount added (wt. %) | catalyst (wt. %)* | Retention (%) | |
| --- | --- | --- | --- | --- | --- | --- |
| | | | | | Strength | Adhesion |
| A | (comparative example) | None | 0 | 0 | 31.6 | 38.0 |
| F | (present invention) | 1,3-PBO | 3 | 0 | 95.3 | 65.0 |
| J | (present invention) | | 3 | 0.5 | 98.1 | 68.7 |
| K | (present invention) | | 3 | 1 | 99.1 | 70.2 |
| L | (present invention) | | 3 | 2 | 99.6 | 68.5 |
| M | (present invention) | 2-Phenyl-2-oxazoline | 5 | 0 | 92.3 | 60.1 |
| N | (present invention) | 2,2'-Bis(2-oxazoline) | 5 | 0 | 94.8 | 63.5 |
| O | (present invention) | 2,2'-(1,3-Phenylene)bis (5,6-dihydro-4H-1,3-oxazine) | 2 | 0 | 60.2 | 57.4 |
| P | (present invention) | | 2 | 1 | 98.8 | 72.7 |
| Q | (present invention) | | 4 | 0 | 97.4 | 81.6 |

EXAMPLE 3

Polyarylate synthesized by the copolymerization of 40 moles of p-acetoxybenzoic acid, 15 moles of terephthalic acid, 5 moles of isophthalic acid and 20 moles of 4,4'-diacetoxydiphenyl was melt-spun and wound up at 680 m/min. The spun yarns obtained were heat-treated at a temperature of 320° C. for 3 hours in a nitrogen gas stream to obtain 1005 denier fibers of 28.3 g/d in tenacity, 925 g/d in initial modulus and 3.1% in elongation. Using the fibers, a two-ply cord of 40 t/10 cm in twist number for each of cable twist and ply twist was prepared. The dip-treatment was applied to the cords in order to give a property to adhere to the rubber. For the first treating bath there was used an aqueous dispersion of an epoxy resin, and for the second treating bath there was used the RFL solution. The treated cords thus obtained had the following properties: tensile strength 30.5 kg; 6.8 kg elongation, 1.3%; and elongation at breakage, 3.0%. The treated cords were embedded in rubbers which are different in the amount of 1,3-PBO added, and vulcanized at a temperature of 170° C. The results are shown in Table 3. As is apparent from these results, the chemical stability of polyarylates, which have so far been said to be chemically unstable to amines in rubber, is remarkably improved by incorporating 1,3-PBO in the rubber composite. Thus, there is obtained a prospect that polyarylate fibers can be put to practical use as a reinforcing material for heavy duty tires (for example tires for trucks and buses), which can be expected from their properties.

TABLE 3

| | Content of 1,3-PBO (wt. %) | | Vulcanization time | | |
|---|---|---|---|---|---|
| | | | 15 min. | 1 hour | 3 hours |
| H adhesion test (kg/cm) | 0 | comparative example | 9.8 | 3.7 | 2.6 |
| | 5 | present invention | 9.7 | 10.1 | 9.2 |
| Strength retention (%) | 0 | comparative example | 96.2 | 70.3 | 17.7 |
| | 5 | present invention | 102.4 | 101.2 | 98.8 |

EXAMPLE 4

Poly(ethylenenaphthalene-2,6-dicarboxylate) having an intrinsic viscosity of 0.75 dl/g was melt-spun and stretched to obtain 1000-denier fibers having a tenacity of 8 g/d and an elongation of 5.6% at breakage. Using the resulting fibers, a two-ply cord of 40 t/10 cm in twist number for each of cable twist and ply twist was prepared, and to the cords were applied the same dip-treatment and vulcanization-treatment as in Example 1. It was observed that the composite containing 5 wt.% of 1,3-PBO was greatly improved in both the strength retention and adhesion strength retention.

TABLE 4

| | | Content of 1,3-PBO (wt. %) | Retention (%) |
|---|---|---|---|
| H adhesion test (%) | 0 | comparative example | 41.7 |
| | 5 | present invention | 85.3 |
| Strength (%) | | comparative | 60.2 |

TABLE 4-continued

| | | Content of 1,3-PBO (wt. %) | Retention (%) |
|---|---|---|---|
| | 0 | example | |
| | 5 | present invention | 99.5 |

EXAMPLE 5

The adhesive-treated cords used in Example 1 were dipped in a water/ethanol (1:2) mixed solution containing 20% of dissolved 1,3-PBO, air-dried and then further dried at a temperature of 80° C. on a vacuum drier. The cords thus treated and the cords before the treatment were each embedded in the same rubber composition as used in Example 1 and vulcanized at a temperature of 170° C. for varying times of 30 minutes and 3 hours. The retentions of strength and adhesion strength after 3 hours' vulcanization are remarkably improved as shown in Table 5. This result shows that the cyclic iminoether of the present invention is effective even when applied to either the surface or the vicinity of the adhesive-treated cords.

TABLE 5

| | Dipping in 1,3-PBO solution | Retention (%) |
|---|---|---|
| H adhesion test (%) | Not dipped (comparative example) | 38.0 |
| | Dipped (present invention) | 67.1 |
| Strength (%) | Not dipped (comparative example) | 31.6 |
| | Dipped (present invention) | 98.5 |

According to the method of the present invention, by incorporating a compound containing at least one cyclic iminoether group in the molecule in a rubber matrix excluding the portion of the adhesive-treated polyester fibers, there can be obtained a rubber composite which has been greatly improved in the thermochemical stability of the polyester fibers which are a reinforcing material, and besides which is free from problems such as breaking-out of scorch, etc.

The rubber composite obtained by the present invention can advantageously be used in various processed rubber products, etc. by making use of its characteristics.

What is claimed is:

1. A method of preventing degradation by amine-catalyzed hydrolysis of adhesive-treated polyester fiber cords in a rubber composite containing said cords as a reinforcing material and an amine, which comprises incorporating in said rubber composite excluding said adhesive-treated polyester fiber cords, an antidegradation effective amount, within the range of 0.01 to 20% by weight based on the weight of the rubber composite, of a compound containing in its molecule at least one cyclic iminoether group represented by the formula (I),

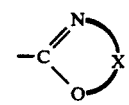 (I)

wherein X represents an ethylene group, substituted ethylene group, trimethylene group or substituted trimethylene group which makes the cyclic structure of the formula (I) a five-membered or six-membered ring.

* * * * *